(12) United States Patent
Gallego Juárez et al.

(10) Patent No.: US 7,719,924 B2
(45) Date of Patent: May 18, 2010

(54) MACROSONIC GENERATOR FOR THE AIR-BASED INDUSTRIAL DEFOAMING OF LIQUIDS

(75) Inventors: Juan Antonio Gallego Juárez, Insituto de Acustica, Consejo Superior de Investigaciones Ccientificas, Serrano, 144, E-28006 Madrid (ES); Germán Rodriguez Corral, Madrid (ES); Fausto Montoya Vitini, Madrid (ES); Victor Acosta Aparicio, Madrid (ES); Enrique Riera Franco De Sarabia, Madrid (ES); Alfonso Blanco Blanco, Madrid (ES)

(73) Assignees: Juan Antonio Gallego Juarez, Madrid (ES); German Rodriguez Corral, Madrid (ES); Fausto Montoya Vitini, Madrid (ES); Victor Acosta Aparicio, Madrid (ES); Enrique Riera Franco De Sarabia, Madrid (ES); Alfonso Blanco Blanco, Madrid (ES)

( * ) Notice: Subject to any disclaimer, the term of this patent is extended or adjusted under 35 U.S.C. 154(b) by 4 days.

(21) Appl. No.: 11/989,544

(22) PCT Filed: Jul. 27, 2005

(86) PCT No.: PCT/ES2005/070113

§ 371 (c)(1),
(2), (4) Date: Apr. 15, 2008

(87) PCT Pub. No.: WO2007/012676

PCT Pub. Date: Feb. 1, 2007

(65) Prior Publication Data
US 2009/0257317 A1 Oct. 15, 2009

(51) Int. Cl.

| H04R 17/00 | (2006.01) |
|---|---|
| H04R 15/00 | (2006.01) |
| G10K 9/12 | (2006.01) |
| G10K 11/02 | (2006.01) |
| B06B 1/02 | (2006.01) |

(52) U.S. Cl. .................................................... 367/140
(58) Field of Classification Search ................. 367/138, 367/158, 140
See application file for complete search history.

(56) References Cited

U.S. PATENT DOCUMENTS 3,761,732 A 9/1973 Ratcliff (Continued)

FOREIGN PATENT DOCUMENTS

ES 2 017 285 1/1991

(Continued)

OTHER PUBLICATIONS

R. M. G. Boucher et al. "Foam control by acoustic and aerodynamic means," British Chemical Engineering, vol. 8, 1963, pp. 808-812.

(Continued)

*Primary Examiner*—Dan Pihulic
(74) *Attorney, Agent, or Firm*—Wenderoth, Lind & Ponack L.L.P.

(57) ABSTRACT

This invention refers to a sonic and/or ultrasonic generator for emission in air with a power capacity and certain radiation characteristics which permit the necessary acoustic levels (>170 dB ref. $2.10^{-4}$ μbar) to be obtained in a way that is safe and controlled for the mechanical breakage of high consistency bubbles constituting industrial foams.

18 Claims, 7 Drawing Sheets

$f2 = 21khz$
$t2 = 0.78t1$
$d2 = 0.88d1$

U.S. PATENT DOCUMENTS

| | | | |
|---|---|---|---|
| 5,299,175 | A | 3/1994 | Gallego-Juarez et al. |
| 6,106,590 | A | 8/2000 | Ueno et al. |
| 2009/0257317 | A1 * | 10/2009 | Gallego Juarez et al. .... 367/157 |

FOREIGN PATENT DOCUMENTS

| | | |
|---|---|---|
| ES | 8903371 | 10/1994 |
| ES | 2 187 382 | 6/2003 |
| GB | 1075100 | 7/1967 |
| JP | 11-197406 | 7/1999 |
| WO | 03/044770 | 5/2003 |
| WO | WO 2007012676 A1 * | 2/2007 |

OTHER PUBLICATIONS

H. Hollfelder, "Improving the efficiency of stem-jet whistles," Ultrasonics 5, Oct. 1967, pp. 250-251.

J. A. Gallego-Juarez, "High Power Ultrasound," Wiley Encyclopedia of Electrical and Electronics Engineering, vol. 9, pp. 49-59, 1999.

T. G. Leighton, "The Acoustic Bubble," Academic Press, London, 1994.

L. Bjorno, "High-power Ultrasonics: Theory and Applications," Proc. of the 13$^{th}$ International Congress on Acoustics, Belgrade 1989, pp. 77-89.

P. Greguss, "The Application of Airborne and Liquid-Borne Sounds to Industrial Technology," Ultrasonics, 1964, pp. 5-10.

E. A. Neppiras, "The pre-stressed piezoelectric sandwich transducer," Ultrasonics International 1973 Conference Proceedings, pp. 295-302.

J. A. Gallego-Juarez, "Piezoelectric ceramics and ultrasonic transducers," J. Phys. E: Sci. Instrum 22, 1989, pp. 804-816.

K. Matsuzawa, "Ultrasonic Transducers with Flexurally Vibrating Diaphragms for Use in Air. II," Japanese Journal of Applied Physics, vol. 9, No. 9, 1970, pp. 1167-1171.

International Search Report issued Apr. 10, 2006 in the International (PCT) Application of which the present application is the U.S. National Stage.

* cited by examiner $f2 = 21khz$
$t2 = 0.78t1$
$d2 = 0.88d1$ (b) According to Spanish pattent No. 8903371
(c) According to the present invention

MACROSONIC GENERATOR FOR THE AIR-BASED INDUSTRIAL DEFOAMING OF LIQUIDS

BACKGROUND OF THE INVENTION

I. Field of the Invention

This invention relates to a sonic and/or ultrasonic generator for the mechanical breakage of high consistency bubbles constituting industrial foams. It can therefore be assigned to the industrial instrumentation sector, with applications in the field of industrial fermentation processes.

II. Description of the Related Art

The problems associated with an excess of foam in industrial processes affect a large number of sectors such as food, pharmaceuticals, the chemical sector, etc. In some of these sectors, and more specifically in those based on fermentation processes, an excess of foam constitutes one of the most serious problems. In particular, an excess of foam leads to a reduction in the capacity of tanks, deficiencies in the process and reactions, spillages and losses of product, difficulties in dosing the container and filling, harmful effects on machinery and equipment, and so on.

Foams are produced in reactors, fermenters, mixers, packaging machines, etc. There exist very different types of foam, and it can be stated that the degree of difficulty for elimination of the foam depends on the foam's characteristics. The methods most commonly used for defoaming are: chemical, mechanical and thermal. Chemical methods are the most effective but they have the problem of contaminating the product. Mechanical procedures such as mobile blades, jets of air or water, etc., are good for thick foams but have little effect on fine foam. Thermal methods consist of heating and cooling the foam, and are expensive and difficult to apply.

The capacity of high intensity sonic and/or ultrasonic waves for producing breakage of foams has been known for decades [see R. M. G. Boucher and A. L. Weiner "Foam control by acoustic and aerodynamic means" British Chemical Engineering vol. 8, 1963, pp. 808-812], though its application has been very limited. This situation can be basically attributed to the lack of adequate macrosonic generators. The acoustic power generators initially used were of the aerodynamic type (sirens, acoustic whistles) which, apart from possessing low efficiency [see H. Hollfelder, Improving the efficiency of stem-jet whistles, Ultrasonics 5, 250-51, 1967)], give rise to a series of collateral problems such as air currents, heating, etc., which hinder their application.

The problem of industrial defoaming has acquired greater importance in recent years on account of growing restrictions on the use of chemical defoamers (the method most used so far), particularly in sectors such as food and pharmaceuticals. This means that the application of macrosonic waves (high intensity sound or ultrasound) is again being considered as a possible means of non-contaminating industrial defoaming. Nevertheless, the most recent precedents on "macrosonic defoaming" resort to the application of sound and/or ultrasound through the liquid [see N. Ueno, Y. Nishi, T. Sakurai, "Method of ultrasonic waves degassing and device using the same", U.S. Pat. No. 6,106,590, 2000. H. K. Ratcliff, "Rotating sonic energy wave", U.S. Pat. No. 3,761,732, 1972, Apparatus for defoaming liquids, U.S. Pat. No. 1,075,100, 1966, F. Shuhei, "Ultrasonic defoaming tank", European Patent EP10020253, 1998., J. A. Gallego-Juárez, "High Power Ultrasound" in Wiley Encyclopedia of Electrical and Electronics Engineering, vol. 9, pp. 49-59, 1999], which in reality implies not the breakage of the foam but instead the degassification of the liquid which is a different process. In fact, in "macrosonic degassification" the wave is generated in the liquid mass and the dissolved gas or gas in the form of small bubbles inside it groups together, forming large size bubbles which gradually increase with oscillation, rising towards the surface where they finally escape from the liquid. This is a phenomenon widely referred to in the literature as "rectified diffusion" [see T. G. Leighton "the acoustic bubble", Academic Press. London 1994] and [L. Bjorno, "High-power Ultrasonics: Theory and Applications" Proc. of the 13$^{th}$ International Congress on Acoustics, Belgrade 1989, pp. 77-89].

"Macrosonic defoaming" is a process of destroying bubbles forming a foam by means of cyclically positive and negative pressure amplitudes generated by high intensity sonic and/or ultrasonic waves impinging on the foam from the air. The mechanisms for breakage of bubbles induced by macrosonic radiation are basically resonances of the bubbles, radiation pressure, friction between bubbles, acoustic currents and atomization of the film which forms the bubble [L. Bjorno, "High-power Ultrasonics: Theory and Applications" Proc. of the 13$^{th}$ International Congress on Acoustics, Belgrade 1989, pp. 77-89].

SUMMARY OF THE INVENTION

The object of the present invention is a macrosonic generator by air for the mechanical breakage of high consistency bubbles constituting industrial foams, which consists of a power electroacoustic transducer and an electronic generator device for controlled excitation thereof. The electroacoustic transducer includes an extensionally vibrating piezoelectric or magnetostrictive transduction element, which acts as an exciter of a radiator in the form of a plate with a discontinuous profile specifically designed for maximizing the power capacity in the generation of focused acoustic fields, and/or reducing the weight of the titanium radiator. The electronic generator introduces a device and procedure for the control and monitoring of the resonance frequency of the transducer and for the constant maintenance of the power supplied to it.

This invention relates to a sonic and/or ultrasonic generator for emission in air with a power capacity and certain radiation characteristics which permit the necessary acoustic levels (>170 dB ref. $2.10^{-4}$ µbar) to be obtained in a way that is safe and controlled for the mechanical breakage of high consistency bubbles constituting industrial foams. For this end, the device incorporates a large surface (compared to the vibration wavelength) vibrating plate as a radiator, constructed in a material with high mechanical strength and good vibrational characteristics (generally a titanium alloy), whose thickness is discontinuously variable in order to distribute the masses, homogenize the amplitudes of the vibratory displacements and, as a consequence, increase the power capacity. The radiator is a plate of large area with non-homogenous thickness which vibrates in one of its flexural modes. Moreover, the volume of the radiating plate is minimized for a defined resonance frequency. The profile of the emitter face of the plate is designed to obtain focused fields by relatively displacing the internodal zones in such a way that the distance of these zones to the focus means that the radiation arrives in phase.

Moreover, the generator incorporates a digital electronic device for the precise control and monitoring of the resonance frequency under the different working conditions.

1. Connection with electronic equipment.

2. Transduction element: piezoelectric (or magnetostrictive) sandwich plus mechanical amplifier.

3. Face of the radiating plate with distribution of thicknesses in order to obtain maximum power capacities of the plate.

4. Face with profile for obtaining focused radiation.

Figure 7:
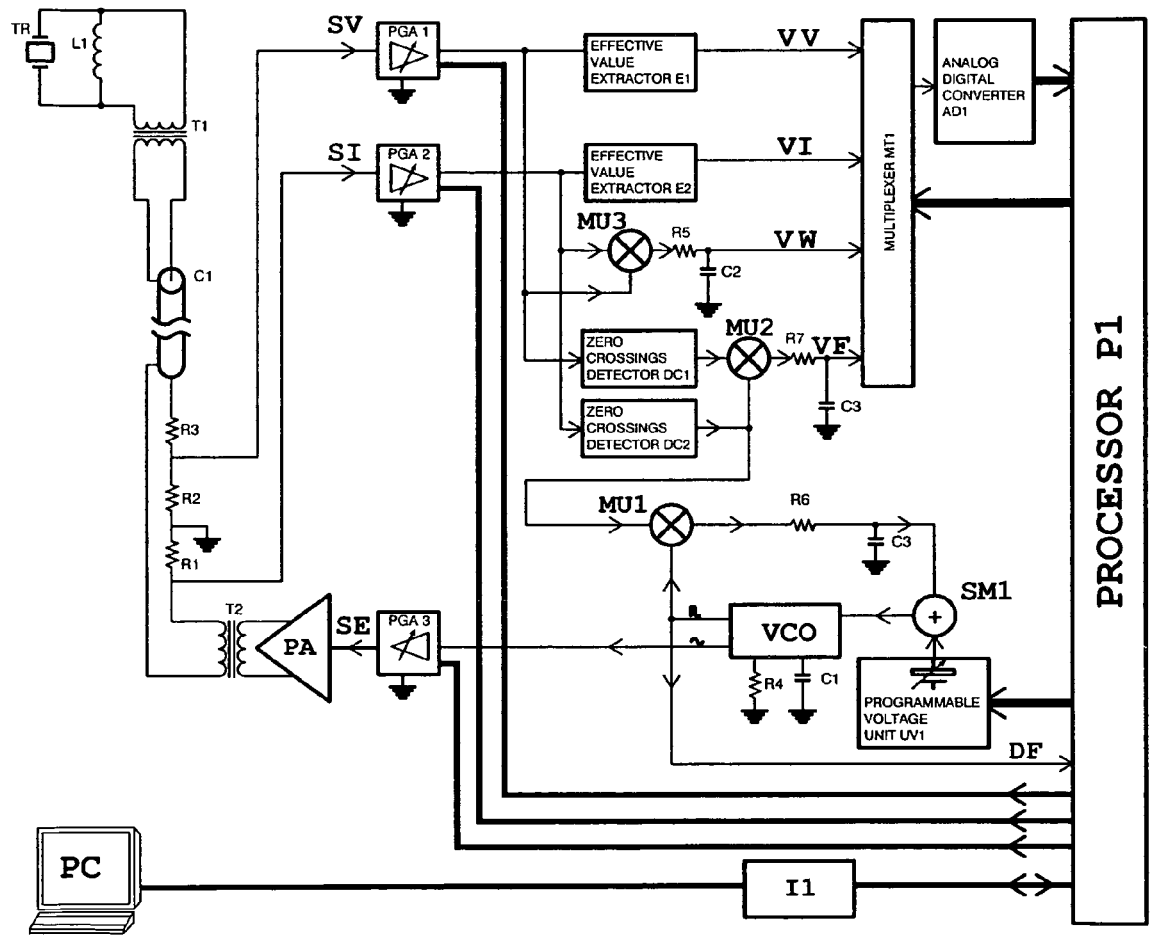

FIG. 7 is a block diagram of the electronic system for generation according to the present invention.

DETAILED DESCRIPTION OF THE INVENTION

The object of the invention is a macrosonic generator for focused emission in air of high intensity sonic or ultrasonic waves on a foamy medium with the aim of breaking the bubbles making up that medium. The generator basically includes a piezoelectric (or magnetostrictive) transduction element, which drives a vibrating plate of large surface (compared to the vibration wavelength in the material) and non-homogenous thickness which vibrates flexurally and acts as an acoustic radiator. The invention includes an electronic system of excitation which incorporates a digital device for programming the operation cycle and the control and monitoring of the resonance frequency under variable working conditions.

Figure 1:
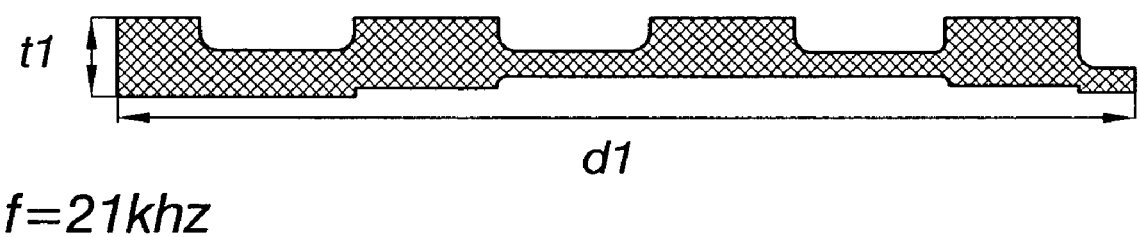
FIG. 1 is a diagram of a plate radiator with discontinuous profile in both faces for directional and focused radiation, respectively (according to Pat. [J. A. Gallego-Juárez et al. "Electroacoustic equipment for the generation of high sonic and ultrasonic intensities in gases and interfaces" Spanish patent No. 8903371, 1989]).

In order to destroy a foam, a high acoustic intensity is required: generally more than 170 dB. Producing this high level in air implies having a high performance acoustic generator with high power capacity which emits a focused acoustic field. In order to achieve these objectives, power generators at high sonic or ultrasonic frequencies are required with very specific characteristics. The generation of high sonic and/or ultrasonic intensities in air presents major difficulties owing to the low acoustic impedance of the medium and its high absorption. The majority of generation systems that have sought to be applied to industrial problems have been of the aerodynamic type (whistle and sirens) in which the energy is supplied by means of a jet of gas [see P. Greguss, "The application of airborne and liquid borne sounds to industrial technology", Ultrasonics 2, 1964]. The acoustic power achieved with these systems was in some cases able to be relatively high, nevertheless the efficiencies obtained were very low. Moreover, they displayed difficulties for working at ultrasonic frequencies and the acoustic signals emitted usually contained harmonics and sub-harmonics. Aerodynamic systems also have the disadvantage that a large part of the gas which produces the excitation energy is propagated together with the acoustic signal. Other ultrasonic generators of the piezoelectric or magnetostrictive type which use extensional solid vibrators are limited in their radiation surface since, in order to avoid transverse vibration modes, they cannot have a cross-section of diameter greater than ⅓ of the wavelength. This also means that their radiation impedance in air (which is proportional to the radiating surface and to the density of the medium) is low and, consequently, so too is their electroacoustic efficiency, which means that they have generally been used for radiation in water [see E. Neppiras, The prestressed piezoelectric sandwich transducer, Ultrasonic International 1973 Conf. Proc. pp. 295-302, J. A. Gallego-Juárez "Piezoelectric ceramics and ultrasonic transducers", J. Phys. E. Sci. Instrum. Vol. 22, pp. 804-816, 1989]. Attempts to increase the radiation surface have led to transducers with radiators in the form of a flexurally vibrating plate [see K. Matsuzawa, "Ultrasonic transducers with flexurally vibrating diaphragms for use in air" I and II, Japanese Journal of Applied Physics vol. 9 No. 3 and 9, pp. 235-45 and 1167-71, 1970]. The problem is that these systems have a very low concentration of energy, owing to the phase cancellation that is produced as a consequence of zones vibrating in counter-phase. Macrosonic generators with plate radiators which present a solution better adapted to the energy concentration are the stepped plate generators [see J. A. Gallego-Juárez et al. "Electroacoustic equipment for the generation of high sonic and ultrasonic intensities in gases and interfaces" Spanish patent No. 8903371, 1989]. In these generators, the radiating element is a plate vibrating under flexion but which, instead of being flat, displays a discontinuous profile. The design of the profile is obtained by displacing the internodal zones in order to bring the radiation into phase. Plate radiators with discontinuous profile on their two faces are thus obtained which generate coherent fields via one face and focused fields via the other (FIG. 1).

Nevertheless, these generators, which are general purpose, display certain difficulties for use in industrial defoaming. In particular, they have limitations in their power capacity and their structure with a profile for directional fields, and they lack specific utility for industrial defoaming. Moreover, the control system for the resonance frequency used in these generators does not have the necessary stability for industrial treatments. In fact, the system claimed in the cited patent, J. A. Gallego-Juárez et al. "Electroacoustic equipment for the generation of high sonic and ultrasonic intensities in gases and interfaces" Spanish patent No. 8903371, 1989, is based on analog type oscillators consisting of a power amplifier with feedback from the actual ultrasonic transducer by means of a tuned bridge circuit, a dephaser, a limiter and a filter; or by means of monitoring the resonance frequency of the emitter by means of a phase locked loop (PLL). These systems present a fairly critical behavior, particularly in the initial instants of emission, in which the transducer device is completely cold, furthermore requiring the use of precision components and various adjustment points, which have to be individually adjusted for each ultrasonic emitter that is connected. Another problem is that with the variation in the working conditions of the transducer, the power emitted can vary appreciably, with the consequent loss of effectiveness of the system or its overloading. These problems mean that each time the generator is started up it has to be adjusted by a specialized human operator and, moreover, it requires permanent monitoring in case the emission power drops.

On account of all this, these generators are clearly insufficient for application to defoaming under industrial conditions. The power capacity of the transducer needs to be enlarged, its structure needs to be simplified and more stable and precise electronics need to be introduced.

Figure 2:
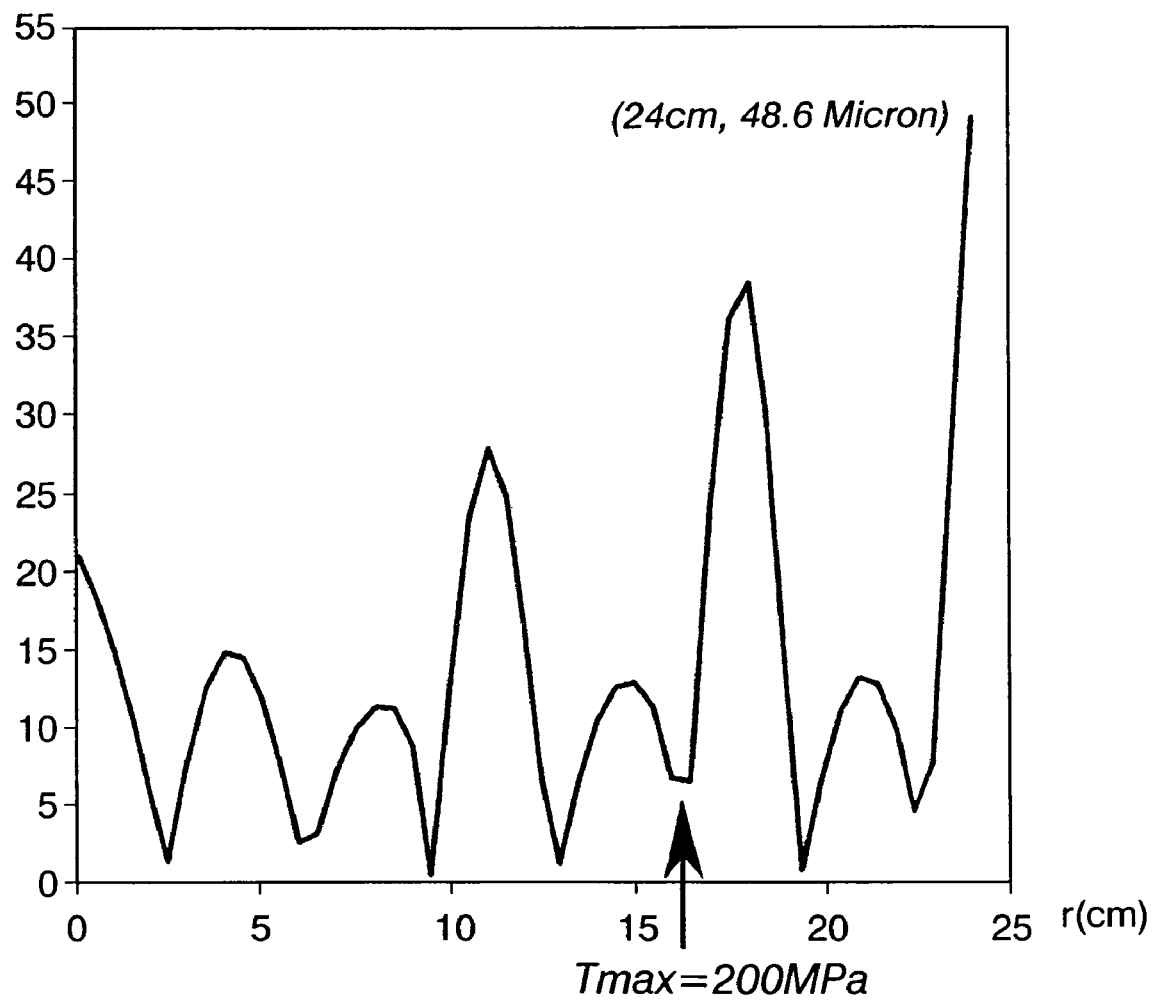
FIG. 2 is a distribution of the vibration amplitudes in a focused/directional radiator according to Pat. [J. A. Gallego-Juárez et al. "Electroacoustic equipment for the generation of high sonic and ultrasonic intensities in gases and interfaces" Spanish patent No. 8903371, 1989].
Figure 3:
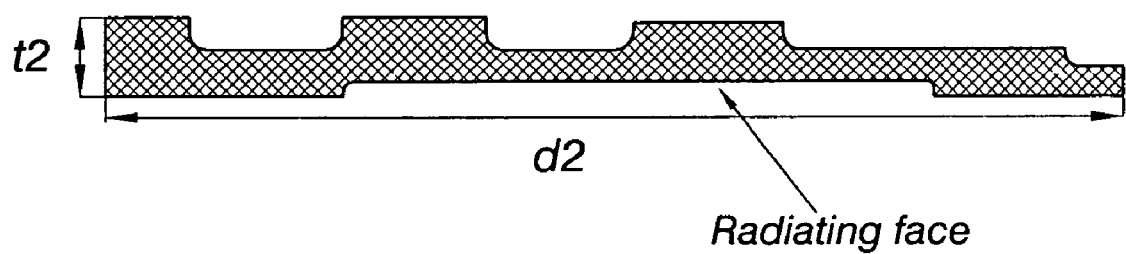
FIG. 3 is a diagram of a plate radiator for focused emission with maximum power capacity, according to the present invention.

The problem of limitation in the power capacity derives from the fact that the distribution of vibration amplitudes in the internodal zones is not homogenous; instead there exist amplitude maxima and minima and the difference between them is considerable (FIG. 2). This is a fundamental limiting factor since, for a given radiating surface, the power capacity is determined by the maximum stresses which can be reached without the vibrating plate reaching its fatigue limit. In the case of a distribution lacking in homogeneity in vibration amplitudes, the limit displacement could be reached at a point of maximum amplitude for relatively low applied powers. For plates made of titanium alloys, which is a material highly resistant to fatigue, the maximum stress limit is fixed at approximately 200 MPa. This means that, with the displacements distribution of FIG. 3, the maximum displacement would be 48.6 microns. This displacements distribution can be improved, and the power capacity of these radiators can therefore be amplified, by means of a redistribution of the masses of the plate. So, a new kind of radiator has been designed which, in addition to incorporating on its radiating face the profile required for the generation of a focused acoustic field, necessary for the defoaming, has on its non-radiating face a profile that is determined by the redistribution of the vibration amplitudes. The configuration of this profile is carried out with the following objectives: increase the amplitudes of the displacements of the peripheral internodal zone, which account for the major part of the radiation surface, and at the same time reduce the displacements of the central internodal zones. In order to achieve this, the profile of the non-radiating face is modified according to the following criterion: the thickness of the steps located in the peripheral internodal zones is made slimmer while that of the central zones is maintained, or slightly modified. These modifications are carried out by means of using a finite element model to make sure that the maximum mechanical stress at all times remains within the peripheral zones.

Figure 4:
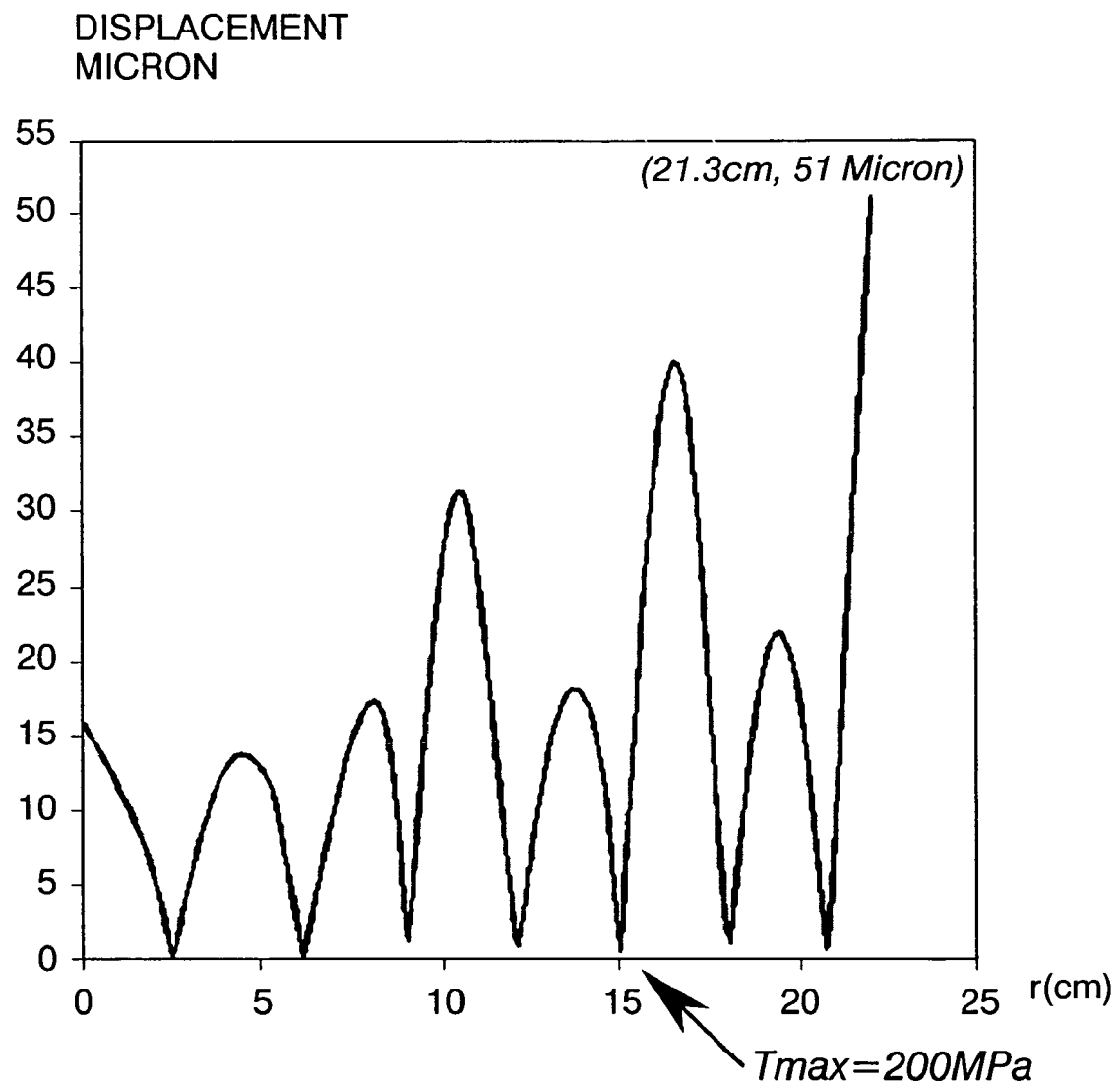
FIG. 4 is a distribution of the vibration amplitudes in a power radiator designed according to the criteria of the present invention.
Figure 5:
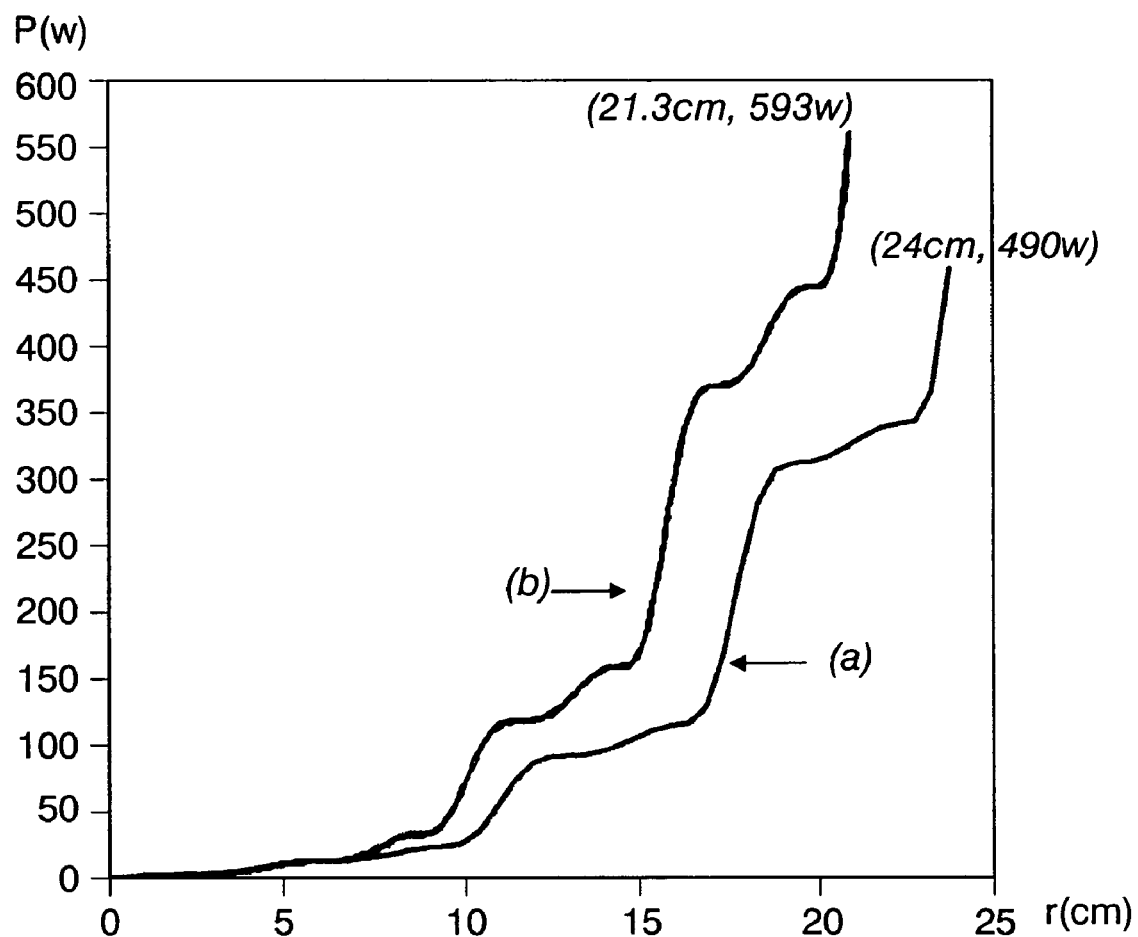
FIG. 5 is a comparison of the power capacity curves for two plate radiators designed: (a) according to Patent [J. A. Gallego-Juárez et al. "Electroacoustic equipment for the generation of high sonic and ultrasonic intensities in gases and interfaces" Spanish patent No. 8903371, 1989], (b) According to the present invention.
Figure 6:
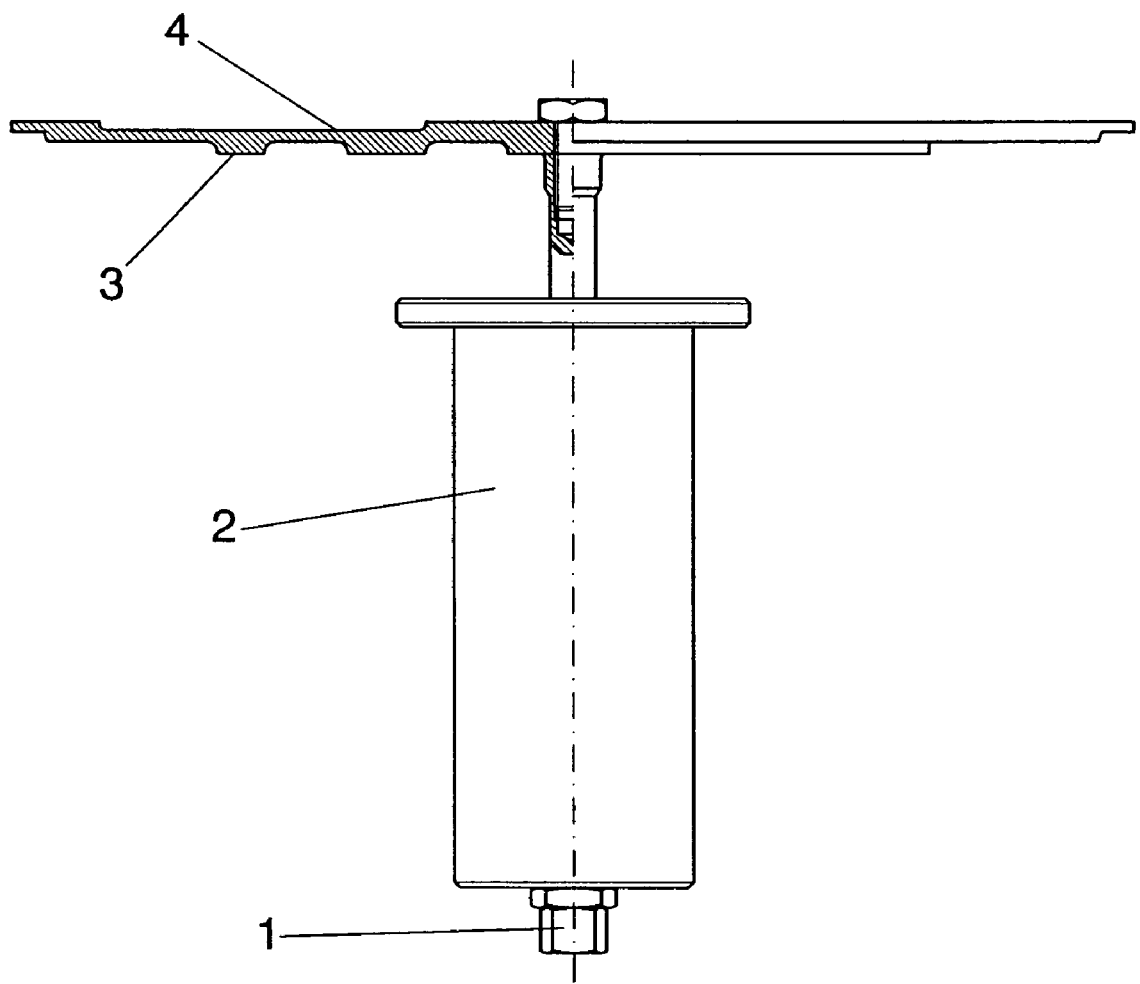
FIG. 6 is a diagram of a macrosonic transducer with plate radiator according to the present invention, including.

With a plate made according to these criteria (FIG. 3), a distribution of the vibration amplitudes is achieved which, as can be seen from FIG. 4, increases the amplitudes in the peripheral internodal zones, which, bearing in mind that the power is a function of the square of the amplitude, implies a notable increase in the power capacity. In fact, the radiator of FIG. 3 designed with these new criteria for the same frequency (21 kHz) as the radiator of FIG. 1 (designed according to J. A. Gallego-Juárez et al. "Electroacoustic equipment for the generation of high sonic and ultrasonic intensities in gases and interfaces" Spanish patent No. 8903371, 1989) presents a power capacity of almost 600 W (compared to 490 W of the previous model) (FIG. 5). This improvement is furthermore achieved with a radiating surface that is 23% smaller since, in order to maintain the frequency and the vibration mode, the diameter has been reduced. Bearing in mind that the power capacity is proportional to the radiation surface, if we compare two plates of the same surface, designed according to [J. A. Gallego-Juárez et al. "Electroacoustic equipment for the generation of high sonic and ultrasonic intensities in gases and interfaces" Spanish patent No. 8903371, 1989] and according to the present invention, the increase in the power capacity of the latter over the former would be of the order of 50% for an equal surface. So, with the present invention, one achieves not just an increase in the power capacity of the radiator but also a reduction in its volume (which implies a lower cost of the titanium material generally used) and a simplification in its profiles, which facilitates their machining. FIG. 6 shows a diagram of the macrosonic transducer with the radiator according to the present invention.

As far as the electronic generation system forming the object of the present patent is concerned (FIG. 7), it introduces a new procedure for monitoring the resonance frequency of the emitter and for keeping the power constant without needing the presence of a human operator. The procedure is based on the inclusion of a microcontroller in the control loop of the transducer which automatically and at all times maintains the optimum emission conditions.

This method presents a series of advantages over those mentioned above:

a) The parameters of the generator do not need to be adjusted manually each time it is switched on, and can be started by any person without requiring specialization.

b) The functioning of the system at the resonance point is very stable, faithfully adapting itself to changes in resonance frequency and electrical impedance caused by variations in the characteristics of the medium in which the emitter is radiating, and those deriving from ageing of the system, without requiring any monitoring while in operation.

c) It is not necessary to make adjustments each time the transducer is changed, since the generator automatically adapts itself to the characteristics of each individual transducer.

d) The production of the electronic device does not require the use of high precision components.

e) It increases the reliability and longevity of the complete system due to having greater protection and better control.

f) It has remote supervision and telemetry capacity, permitting automated maintenance routines.

g) It is adapted to industrial situations with tough environmental conditions.

As shown in the block diagram of FIG. 7, the generator system consists of the following fundamental stages:

1) A compensation reactance L1 for the parasitic capacitance of the transducer.

2) An impedance adaptation transformer T1, which lowers the impedance of the transducer to that of the characteristic impedance of the transmission line described in the following paragraph.

3) A common transmission line C1, for connecting the transducer, transformer T1 and reactance L1 array with the amplifier and control system array.

4) An impedance transformer T2, which adapts the characteristic impedance of the transmission line C1 to the output impedance from the power amplifier described in the following paragraph.

5) A power amplifier A1, suitable for supplying the necessary power to the transducer.

6) A channel for taking a sample of the current signal in the secondary of transformer T2.

7) A channel for taking a sample of the voltage applied to the transmission line C1.

8) The array of analog signal processors PGA1, PGA2, PGA3, E1, E2, DC1, DC2, MU1, MU2, amplifies the electric signals with different values of gain (PGA1, PGA2, PGA3) in different sections of the process in order to extract their effective value characteristic (E1, E2) from the voltage and current samples, zero crossings of the signal (DC1, DC2) or obtaining results from the multiplication (MU1, MU2, MU3) of them.

9) A PLL (Phase Locked Loop) circuit for generation of the exciter signal of the power amplifier, with frequency equal to the resonance frequency of the transducer.

10) The programmable voltage unit UV1 and the analog adder SM1, for frequency and phase correction.

11) The analog/digital converter AD1, multiplexer M1.

12) A processor P1 for performing measurement operations of the working conditions, stability control over phase, power and working frequency band, supervision of the complete electroacoustic system, monitoring of variables and parameters, as well as communication with remote computers or devices.

13) A communications interface I1, for connecting the microprocessor M1 to a remote computer.

The functioning of each of these stages is described below individually along with their interrelation.

1) The compensation reactance L1 resonates at the working frequency of the transducer with the parasitic electrical capacitance of the transducer, compensating for the harmful phase difference which the latter could introduce.

2) The transformer T1 has a much broader band than the resonance frequency margin in which the transducer moves, introducing a negligible phase difference. The transformation ratio is such that the impedance presented by the primary is adapted to the characteristic impedance of the transmission line when it is loaded with the transducer cold.

3) The common transmission line C1 is screened in order to prevent the emission of interferences, and can be of the coaxial type, or of the two-wire type with screen, and its characteristic impedance can vary between 50Ω and 300Ω. Depending on the application, it might be necessary for the transducer and the main equipment to be well separated from each other, and therefore the transmission line can be very long, which means that the terminal impedances at its ends need to be adapted.

4) The impedance transformer T2 has a much broader band than the resonance frequency margin in which the transducer moves, introducing a negligible phase difference. The transformation ratio is such that the impedance presented by the secondary is adapted to the characteristic impedance of the transmission line when it is excited by the power amplifier.

5) The power amplifier A1 is able to deliver a suitable power to each application at the working frequency of the transducer. Its design is common and it can be acquired on the market. It has to be capable of functioning uninterruptedly at the maximum rated power.

6) The channel for taking a sample of the current signal in the load is formed by the resistor R1 which is in series with the load of the amplifier and has a value very much less than the characteristic impedance of the line C1, in such a way that it does not appreciably modify the load impedance, and the voltage appearing at its terminals is proportional to the current intensity in the line. The signal obtained serves both to control the frequency and to control the power.

7) The channel for taking a sample of the voltage applied to the transmission line C1 consists of a voltage divider which takes a small fraction of that voltage, constructed from resistors R2 and R3. The signal obtained serves both to control the frequency and to control the power.

8) Array of signal processors

PGA1, PGA2, PGA3, programmable amplifiers, controllable from the processor, PGA1 amplifies the voltage sample, PGA2 the current sample, PGA3 the excitation signal to the PA amplifier. By means of modifying the gain, digitally controllable, they supply the appropriate dynamic level for minimizing errors in the process.

E1, E2, obtain the effective value of the electric signal associated with the voltage sample (E1) and the current sample (E2), which makes it possible to extract later parameters such as the modulus of the impedance, or not exceeding the maximum current admitted by the transducer.

DC1, DC2 are zero crossing extractors of the voltage and current samples, respectively, basically they cut out the input signal just as it passes through the zero value so that their output can only display two states "0" and "1", depending on whether this signal is above or below this value, this provides a trigger value on the basis of which a reference phase can be measured, and with it the phase difference between voltage and current, which is useful as a measure and as error signal for the phase regulation feedback loop by means of the PLL circuit.

MU1, MU2, MU3 are circuit multipliers. The functioning of MU1 is described in the paragraph on the PLL. MU2 is used as a phase comparator, after integrating its output by means of R7 and C3 we obtain the phase difference between voltage and current. MU3 is in charge of obtaining the electrical power on the basis of the above-mentioned voltage and current samples as a product of them, integration via R5 and C2 and subsequent scaling. It is interesting to note that the use of PGA1 and PGA2 in front of MU3 has the aim of increasing the dynamic range and resolution of the converter AD1 which notably improves its performance, as well as (PGA1 resolution bits)×(PGA2 resolution bits), which permits precision power measurement systems to be obtained at low cost.

9) The PLL (Phase Locked Loop) circuit is of the common type. It consists of a VCO (voltage controlled oscillator), a four quadrant multiplier acting as a phase comparator M1 and a low pass filter made up of the resistor R6 and the capacitor C3. The VCO has two outlets, one in the form of a square wave for being sent to the phase comparator and the other in the form of a sinusoidal wave for being sent to the amplifier, with the two outputs being out of phase by $\pi/2$ radians. The other input for the phase comparator is the output current sample signal. The phase comparator is a four quadrant multiplier, so that the PLL is coupled at the frequency at which the phase difference between the two inputs is $\pi/2$, and as the phase difference between the two outputs from the VCO is also $\pi/2$ the result is that it will stay at the frequency at which the phase in the voltage and the current at the output from the power amplifier is 0. The central working frequency of the VCO is regulated by means of the resistor R4 and the capacitor C1. The output from the VCO shows a wave form compatible with the transducer, normally sinusoidal, with its amplitude digitally controlled by PGA3.

10) Since the response from the transducer presents different resonances we have to locate the working zone in one of the resonance modes where the transducer shows the maximum efficiency. The programmable voltage unit UV1 produces an electric voltage, commanded from the processor. The adder SM1 adds this voltage to the phase reading error of the primary control loop of the PLL, in such a way that we can alter the phase and frequency of the VCO, since—as we have stated earlier—we know the former and the frequency, obtained by means of a pulse counting procedure during a known period of time, by means of the DF input. This permits a control loop to be established and the margin of capture of the PLL to be displaced in the zone of frequencies that we wish, and we can therefore proceed to monitor the phase in the band of resonance frequencies that we wish.

11) The converter AD1, along with the multiplexer M1: with four inputs: VV, VI, VW, VF, for the numerical conversion of the value of effective voltage, effective current, power and phase, respectively, in such a way that these can be picked up by the processor, in order to feed the input variable into the different algorithms. The resolution in bits of AD1 is magnified by the use of the digitally controlled amplifiers PGA1 and PGA2 which, as mentioned earlier, notably amplify its dynamic.

12) The processor P1 is of a general type and can be a microcontroller, or a microprocessor, or a signal processor, or a FPGA or any other capable of performing operations in real time at high speed.

It performs the following functions:

a) Measurement and calculation of fundamental parameters of the transducer:
  Measurement of the magnitude of the voltage applied to line L1.
  Measurement of the magnitude of the current in line L1, and calculation of its phase compared to the voltage.
  Measurement of the instantaneous power delivered to the transducer.
  Calculation of the impedance of the transducer in modulus and phase starting from the above measurements of voltage and current.

b) Maintenance of the control and stability loops for: phase, frequency margin and power.

c) Supervision, surveillance and monitoring of the system: Status of the PA amplifier, status of transducer, margins of: excitation, current impedance, resonance modes in frequencies harmful for the transducer. Algorithms for solving different events, strategies for preventing catastrophic failures.

d) Start-up from cold, smooth start-up.

e) Algorithms for resonance search, characterizing the transducer in use, conducting a sweep in a suitable and gradual frequency margin, covering all possible working frequencies of the usual transducers, registering the impedance of the transducer in modulus and phase. On the basis of this measurement, the optimum working frequency of the transducer is determined on the basis of a set of parameters such as: Frequency margins where the resonances have to be found, Range of permissible impedances, Optimum phase and search range, excitation level during the search and search strategies as a function of the frequency shift with respect to the expected resonance frequency search: Coarse, medium and fine.

f) Handling of data visualization menus, introduction and memorizing of parameters from the keyboard.

g) Handling of communications procedures with the outside (PCs and other devices) permit exterior monitoring of data, parameters and internal status and sending of commands which modify the functioning conditions of the transducer such as: working power, working frequency, excitation level in volts.

13) The communications interface I1 is of the standard type for computers to communicate with each other. It can be current loop or voltage, such as the RS232 or RS485 or any other communication interface between computers suitable for transmitting at the distance existing between the electronic equipment and the remote computer controlling it.

The profile of the non-emitting face of the radiating plate is designed by slimming down the thickness of the peripheral internodal zones and maintaining and/or slightly modifying the thickness of the central internodal zones in such a way that the distribution of the maximum displacements is homogenized, being maximized in the peripheral zones and moderated in the central zones.

For a defined vibration frequency and mode, the radiating plate possesses the maximum power capacity with minimum volume.

The electronic generator device:

a. Produces a signal at each instant whose frequency is equal to the optimum of the transduction system, automatically correcting the value of that frequency in order to adapt it to the drifting that can occur in the resonance frequency of the emitter, b. Produces a signal at each instant whose power is constant and equal to the reference power preset at the moment of its configuration, automatically correcting the value of voltage excitation of the transducer in order to adapt it to the variation in the working conditions of it, c. Functions automatically in an autonomous manner without the need for intervention by a specialized operator, d. Functions optimally with any transducer connected to it, independently of its specific resonance frequency characteristics, bandwidth and electrical resistance, without the parameters of the system having to be adjusted, e. Remembers the characteristics of the last transducer which was connected to it and automatically detects whether the connected transducer currently has the same characteristics as the previous one, if not, it proceeds to the complete characterisation of the new transducer, f. Once the complete characterization of a new transducer has been carried out, it automatically commences its excitation at the optimum frequency of the new transducer and at the preset power, g. In the event of a drastic variation in the conditions of the working environment of the transducer causing its characteristics to become completely changed, it proceeds automatically to the complete characterization of as it were a new transducer, h. By means of a communications interface, it can be supervised by a remote computer in order to register both the parameters of the transducer and the working conditions, i. By means of a communications interface, it can be commanded by a remote computer in order to vary the power, electrical excitation and working frequency of the transducer, or to halt it, or start it up, or even for commencing a complete characterization operation of the transducer to which it is connected, along with the different functioning and security parameters, j. By means of a communications interface, it can be supervised or commanded by a remote computer using a data line shared with other identical equipment which can in turn be supervised or commanded, k. It includes a PLL (Phase locked loop) circuit consisting of a voltage controlled oscillator, a four quadrant multiplier acting as a phase comparator and a low pass filter, with three control loops, implemented by means of a processor, one for controlling the output power, another for controlling the working frequency band and the other for controlling the phase between the output current and voltage, l. It supervises and monitors the combined system Electronic excitation generator—Ultrasonic transducer in accordance with a set of parameters such as: working impedance range, working frequency range, maximum admissible phase difference, minimum obtainable phase difference, maximum current, maximum excitation, excitation mode or constant power, excitation level during the characterization, status of the supply voltage, adopting different strategies in order to obtain the maximum energy efficiency, m. It protects the system as a whole, preventing functioning under extreme or excessively adverse conditions for the transducer which, even if it might occasionally be able to work in them, can find its longevity compromised, thus affecting the overall reliability.

The invention claimed is:

1. A macrosonic generator by air for mechanical breakage of high consistency bubbles constituting industrial foams, said macrosonic generator comprising:
    a power electroacoustic transducer comprising a transduction element, said transduction element being one of a magnetostrictive and a piezoelectric element, and extensionally vibrating so to act as an exciter of a radiator in the form of a plate; said radiator provided with an emitting face and a non-emitting face with each face having a discontinuous profile, where said discontinuous profile of the non-emitting face maximizes the macrosonic generator power capacity in the generation of focused acoustic fields, and minimizes radiator weight and volume; and
    an electronic generator device comprising a phase locked loop (PLL) including a voltage controlled oscillator, a four quadrant multiplier acting as a phase comparator and a low pass filter, a first control loop, a second control loop and a third control loop, said first, second and third loops being implemented by a processor, the first loop for controlling and monitoring the output power supplied to the power electroacoustic transducer for the constant maintenance of the power supplied to said power electroacoustic transducer, the second loop for controlling and monitoring the working frequency band of the power electroacoustic transducer and the third loop for monitoring and controlling the phase between the output current and voltage at the resonance frequency of the power electroacoustic transducer.

2. A macrosonic generator by air according to claim 1, wherein the radiator is a plate having a predetermined area with a non-homogenous thickness profile which vibrates in one flexural mode of a plurality of flexural modes.

3. A macrosonic generator by air according to claim 1, wherein the profile of the emitter face of the radiator is designed to obtain focused fields by relatively displacing inter-nodal zones so that the plate radiation arrives in phase.

4. A macrosonic generator by air according to claim 1, wherein the profile of the non-emitting face of the plate is designed to maximize the macrosonic generator power capacity by a redistribution of vibration displacement in the plate, and said redistribution is carried out by adjusting the balance between the masses of the intermodal zones by:
    including mass steps in the central zones to reduce vibration in said zones; and
    carrying out one of slimming said mass steps, leaving a flat face in the peripheral zones and combinations thereof to increase vibration in said zones.

5. A macrosonic generator by air according to claim 4, wherein for a defined vibration frequency and mode, the plate possesses the maximum power capacity with minimum volume.

6. A macrosonic generator by air according to claim 1, wherein the electronic generator device produces a signal at each instant having a frequency equal to the optimum of the transduction element, automatically correcting the value of the frequency in order to adapt the frequency to drifting in the resonance frequency of the emitter when said drifting takes place.

7. A macrosonic generator by air according to claim 1, wherein the electronic generator device produces a signal at each instant having power that is constant and equal to the reference power preset at the moment of said electronic generator device configuration, automatically correcting the value of voltage excitation of the power electroacoustic transducer in order to adapt to the variation in the working conditions of said power electroacoustic transducer.

8. A macrosonic generator by air according to claim 1, wherein the electronic generator device functions automatically in an autonomous manner without the need for intervention by a specialized operator due to the first, second and third control loops in the power electroacoustic transducer.

9. A macrosonic generator by air according to claim 1, wherein the electronic generator device is independent of the power electroacoustic transducer connected to said electronic generator device for functioning optimally, and further independent of the power electroacoustic transducer specific resonance frequency characteristics, bandwidth and electrical resistance, without the parameters of the macrosonic generator having to be adjusted.

10. A macrosonic generator by air according to claim 1, wherein the electronic generator device remembers the characteristics of the last power electroacoustic transducer which was connected to said electronic generator device and automatically detects whether the connected power electroacoustic transducer currently has the same characteristics as the previous one, if not, said electronic generator device proceeds to the complete characterization of the new transducer.

11. A macrosonic generator by air according to claim 10, wherein, once the complete characterization of a new power electroacoustic transducer has been carried out, the electronic generator device automatically commences power electroacoustic transducer excitation at the optimum frequency of the new power electroacoustic transducer and at the preset power.

12. A macrosonic generator by air according to claim 1, wherein in the event of a drastic variation in the conditions of the working environment of the bower electroacoustic transducer causing the power electroacoustic characteristics to become completely changed, the electronic generator device proceeds automatically to the complete characterization of the power electroacoustic so that the power electroacoustic is a new power electroacoustic transducer.

13. A macrosonic generator by air according to claim 9, wherein, by a communications interface, the electronic generator device is supervised by a remote computer in order to register both the parameters of the power electroacoustic transducer and the working conditions.

14. A macrosonic generator by air according to claim 1, wherein, by a communications interface, the macrosonic generator is commanded by a remote computer in order to carry out one option selected from the group consisting of:

varying the power, electrical excitation and working frequency of the power electroacoustic transducer;

stopping the macrosonic generator;

starting the macosonic generator up;

carrying out a complete characterization operation of the power electroacoustic transducer to which the electric generator device is connected; and determining the different operation and security parameters.

15. A macrosonic generator by air according to claim 1, wherein, by a communications interface, the electronic generator device is supervised or commanded by a remote computer using a data line shared with other identical equipment which are in turn supervised or commanded.

16. A macrosonic generator by air according to claim 1, wherein the electronic generator device comprises:

supervising and monitoring the macrosonic generator in accordance with at least one parameter selected from the group consisting of: working impedance range, working frequency range, maximum admissible phase difference, minimum obtainable phase difference, maximum current, maximum excitation, excitation mode or constant power, excitation level during the characterization, and status of the supply voltage, adopting different strategies in order to obtain the maximum energy efficiency, and protecting the system as a whole, preventing functioning under extreme or excessively adverse conditions for the power electroacoustic transducer.

17. A macrosonic generator by air according to claim 1, wherein the radiator is made of a material with a mechanical strength and vibrational characteristics that facilitate at least a distribution of mass and homogenization of amplitude of vibratory displacements.

18. A macrosonic generator by air according to claim 17, wherein the radiator is made of a titanium alloy.

* * * * *